(12) United States Patent
Kfir et al.

(10) Patent No.: US 8,677,435 B2
(45) Date of Patent: Mar. 18, 2014

(54) UPSTREAM POWER CONTROL FOR MULTIPLE TRANSMIT CHANNELS

(75) Inventors: Ziv Kfir, Yavne (IL); Efrat Levy, Tel Aviv (IL); Naor Goldman, Moshav Ein-Vered (IL)

(73) Assignee: Intel Corporation, Santa Clara, CA (US)

( * ) Notice: Subject to any disclaimer, the term of this patent is extended or adjusted under 35 U.S.C. 154(b) by 1512 days.

(21) Appl. No.: 12/323,928

(22) Filed: Nov. 26, 2008

(65) Prior Publication Data

US 2010/0131999 A1 May 27, 2010

(51) Int. Cl.
H04N 7/173 (2011.01)

(52) U.S. Cl.
USPC .......................................... 725/111; 725/127

(58) Field of Classification Search
None
See application file for complete search history.

(56) References Cited

U.S. PATENT DOCUMENTS

| | | | |
|---|---|---|---|
| 6,871,078 B2 * | 3/2005 | Nishioka et al. | 455/522 |
| 2005/0025323 A1 * | 2/2005 | Botti et al. | 381/120 |
| 2005/0058082 A1 * | 3/2005 | Moran et al. | 370/252 |

OTHER PUBLICATIONS

Data Over Cable Services Interface Specifications (DOCSIS) 3.0 Physical Layer Specification, CM-SP-PHYv3.0-I07-080522, pp. 65-75, May 22, 2008.

* cited by examiner

Primary Examiner — Cai Chen
(74) Attorney, Agent, or Firm — Grossman, Tucker, Perreault & Pfleger, PLLC

(57) ABSTRACT

A novel apparatus for and method of upstream power control for multiple transmit channels. The invention is particularly useful in environments that include two level amplification, wherein the first level corresponds to each channel separately and the second level corresponds to the joint sum of all the channels. When working with two-level amplification, changing the joint sum amplification is permitted during specific time periods known as "CMTS re-configuration time" in the DOCSIS specification. The mechanism functions to maintain an optimal transmit power operating point of the PGA using self-configuration without any need to receive permission from an exterior control entity such as the cable head-end thus bypassing the prior art requirement of waiting for a global reconfiguration time from the CMTS (i.e. when the specification assures that there is sufficient time to change the PGA gain). This can be achieved with high confidence if there is sufficient quiet time (which is calculated) to perform the self-configuration of the PGA within a specific period of time.

21 Claims, 10 Drawing Sheets

UPSTREAM POWER CONTROL FOR MULTIPLE TRANSMIT CHANNELS

FIELD OF THE INVENTION

The present invention relates to the field of data communications and more particularly relates to an apparatus for and method of upstream power control for multiple transmit channels.

BACKGROUND OF THE INVENTION

In the field of data communications, the exploding demand for broadband network communications has spread to a number of different forms of communications media, e.g., cable, satellite, twisted copper pair, optical fiber, etc. Currently, half the households in the United States have high-speed broadband Internet access. Recently, the cable modem has become the broadband connection of choice for many Internet users, being preferred over the nearest rival broadband technology, Digital Subscriber Line (DSL), by a significant margin.

Cable modems are well known in the art. A cable modem is a type of modem that provides access to a data signal sent over the cable television (CATV) infrastructure. Cable modems are primarily used to deliver broadband Internet access, taking advantage of unused bandwidth on a cable television network. In 2005 there were over 22.5 million cable modem users in the United States alone.

A cable modem is a network appliance that enables high speed data connections to the internet via data services provided by the local cable company. Data from the home is sent upstream on a carrier that operates on the 5 MHz to 42 MHz band of the cable spectrum. Downstream data is carried on an 88 MHz to 860 MHz band. The cable modem system can have additional networking features such as Voice over IP (VoIP), wireless connectivity or network switch or hub functionality.

The term cable Internet access refers to the delivery of Internet service over the cable television infrastructure. The proliferation of cable modems, along with DSL technology, has enabled broadband Internet access in many countries. The bandwidth of cable modem service typically ranges from 3 Mbps up to 40 Mbps or more. The upstream bandwidth on residential cable modem service usually ranges from 384 kbps to 30 Mbps or more. In comparison, DSL tends to offer less speed and more variance between service packages and prices. Service quality is also far more dependent on the client's location in relation to the telephone company's nearest central office or Remote Terminal.

Users in a neighborhood share the available bandwidth provided by a single coaxial cable line. Therefore, connection speed varies depending on how many people are using the service at the same time. In most areas this has been eliminated due to redundancy and fiber networks.

With the advent of Voice over IP telephony, cable modems are also be used to provide telephone service. Many people who have cable modems have opted to eliminate their Plain Old Telephone Service (POTS). An alternative to cable modems is the Embedded Multimedia Terminal Adapter (EMTA). An EMTA allows multiple service operators (MSOs) to offer both High Speed Internet and VoIP through a single piece of customer premise equipment. A multiple system operator is an operator of multiple cable television systems.

Many cable companies have launched Voice over Internet Protocol (VoIP) phone service, or digital phone service, providing consumers a true alternative to standard telephone service. Digital phone service takes the analog audio signals and converts them to digital data that can be transmitted over the fiber optic network of the cable company. Cable digital phone service is currently available to the majority of U.S. homes with a large number of these homes subscribing to the service. The number of homes subscribing is currently growing by hundreds of thousands each quarter. One significant benefit of digital phone service is the substantial consumer savings, with one recent study saying residential cable telephone consumers could save an average of $135 or more each year.

The Data Over Cable Service Interface Specification (DOCSIS) compliant cable modems have been fueling the transition of cable television operators from a traditional core business of entertainment programming to a position as full-service providers of video, voice, and data telecommunications services.

The latest DOCSIS specification, DOCSIS 3.0, include a number of enhancements, most notably, channel bonding and support for IPv6. Channel bonding provides cable operators with a flexible way to increase upstream and downstream throughput to customers, with data rates in the hundreds of megabits and potentially gigabits per second. DOCSIS 3.0 increases the capacity of cable modems to a minimum of 160 Mbps downstream to customers and to a minimum of 120 Mbps upstream.

Cable systems transmit digital data signals over radio frequency (RF) carrier signals. To provide two-way communication, one carrier signal carries data in the downstream direction from the cable network to the customer and another carrier signal carries data in the upstream direction from the customer to the cable network. Cable modems are devices located at the subscriber premises that functions to convert digital information into a modulated RF signal in the upstream direction, and to convert the RF signals to digital information in the downstream direction. A cable modem termination system (CMTS) performs the opposite operation for multiple subscribers at the cable operator's head-end.

Typically, several hundreds of users share a 6 MHz downstream channel and one or more upstream channels. The downstream channel occupies the space of a single television transmission channel in the cable operator's channel lineup. It is compatible with digital set top MPEG transport stream modulation (64 or 256 QAM), and provides up to 40 Mbps. A media access control (MAC) layer coordinates shared access to the upstream bandwidth.

In order to provide faster data rates to customers, DOCSIS 3.0 introduces the concept of bonding several physical downstream channels into one virtual high speed pipe. Channel bonding is a load-sharing technique for logically combining multiple DOCSIS channels. DOCSIS 3.0 defines channel bonding for both the upstream and downstream directions. For downstream channel bonding, each downstream DOCSIS channel carries a payload of approximately 38 Mbps (50 Mbps with EuroDOCSIS). Load sharing traffic across multiple channels allows a maximum throughput of up to n×38 Mbps (or n×50 Mbps), with n representing the number of channels being bonded. A separate 6 MHz or 8 MHz frequency is used for each of the bonded channels. Upstream channel bonding is possible to implement, for example, over four channels, 10 to 30 Mbps each, for a total of 40 to 120 Mbps of shared throughput.

In DOCSIS 3.0 each active upstream channel has a different dynamic range window in which the channel can transmit. A diagram illustrating the dynamic range window for each upstream transmit channel in DOCSIS 3.0 system is shown in FIG. 1. The top of each dynamic window is determined according to the burst profile of the particular channel (i.e.

TDMA/SCDMA, constellation which is different for each channel) and to a parameter known as $P_{load\_min\_set}$. The $P_{load\_min\_set}$ parameter 66 is normally sent as a command from the CMTS and is the same for all channels. The DOCSIS 3.0 specification ensures a global quiet time (i.e. time when all channels are quiet) only after a new $P_{load\_min\_set}$ parameter is received from the CMTS.

The upper limit of each channel is $P_{hi}$ 65 (i.e. $P_{hi\_1}$, $P_{hi\_2}$, $P_{hi\_3}$, $P_{hi\_4}$, for channels 1-4, respectively). The $P_{load\_min\_set}$ parameter 66 determines the upper point of the dynamic range window 67 which is 12 dB. The lower limit of each dynamic range window is thus 12 dB down from the upper limit and is referred to as $P_{low\_multi}$ 68 (i.e. $P_{low\_multi\_1}$, $P_{low\_multi\_2}$, $P_{low\_multi\_3}$, $P_{low\_multi\_4}$, for channels 1-4, respectively). For example, assuming a $P_{hi}$ of 60 dBmV and a $P_{load\_min\_set}$ of 5 dBmV, results in an upper limit of the dynamic range window of 55 dBmV and a lower limit of 43 dBmV. The working point for each channel is within the dynamic range window.

To reduce the cost of a cable modem system, it is common to include only a single programmable gain amplifier (PGA) for all four upstream channels, as the cost of the amplifier hardware component is relatively substantial. Typically, the upstream system includes several channels whose digital outputs are summed before entering a DAC. Each channel is duplex and operates at a different frequency. The analog output of the DAC is amplified by the single amplifier (e.g., PGA) before being coupled to the CATV cable. Each channel comprises a digital attenuator for adjusting the output signal level before entering the DAC.

With an upstream system implementation that includes only a single PGA for all channels, the gain of the PGA can only be changed when the CMTS grants a global reconfiguration time (i.e. global quiet time). Thus, each setting of the PGA must be suitable for all possible gain configurations the cable modem may be commanded to set, until the next global reconfiguration time. This implies that one or more channels may have a large backoff part of the time (or all of the time) when their output signals enter the DAC. This results in the PGA gain being set at a sub-optimal point the majority of the time. Note that the CMTS re-configuration time events as indicated in the DOCSIS specification are mandatory after a change in $P_{load\_min\_set}$, regardless of the frequency of their occurrence.

Having a large backoff in the channels results in significant interference and noise as a result of the attenuation at the input to the DAC. The larger the attenuation, the more noise that is generated. Ideally, the output signals from the channels should enter the DAC with minimum backoff to achieve the highest input signal level. Note that some backoff is required in order to prevent clipping of the output signal.

In prior art DOCSIS systems, with only a single channel, all gain changes could be made (1) at the PGA and (2) by changing the digital attenuation at the input to the DAC (i.e. changing the digital gain). The CMTS, does, however, issue gain commands on a per channel basis. In response, the modem sets the digital attenuator in front of the DAC but only when the specific channel is quiet. The PGA must accept the highest gain for each channel that is permissible, i.e. the highest gain in the dynamic range window, while also taking into account a possible change to $P_{hi}$. The value of $P_{load\_min\_set}$ sent in a command from the CMTS determines the placement of the dynamic range window. Each channel has the same size window, but at a different location. The DOCSIS specification dictates that a new $P_{load\_min\_set}$ is set at a global quiet time. It is at this time, the PGA gain can be changed.

In response to requests from the CMTS for gain changes for a single channel (i.e. within the dynamic range window), the cable modem changes the digital gain in front of the DAC. This results in sub-optimal operation when all upstream channels are combined. Although the CMTS is able to change the $P_{load\_min\_set}$, it cannot do it often. Ideally, the cable modem always transmits at a maximum signal level. It is thus desirable to change the PGA gain every time the gain of a channel is to be changed.

It is preferable for the channel output signals to enter the DAC with the smallest backoff possible in order to minimize frequency spurs which are limited by the DOCSIS standard. To minimize spurs, the full scale is set as close as possible to the actual transmit power. The ability to change the PGA gain setting more frequently would thus enable gain changes, including both changes at the PGA and digital gain changes) to be more optimized with respect to back off, resulting in better performance.

SUMMARY OF THE INVENTION

The present invention is a novel apparatus for and method of upstream power control for multiple transmit channels. The invention is particularly useful in environments that include two level amplification, wherein the first level corresponds to each channel separately and the second level corresponds to the joint sum of all the channels. When working with two-level amplification, changing the joint sum amplification is permitted during specific time periods known as "CMTS re-configuration time" in the DOCSIS specification.

The upstream power control mechanism of the invention functions to maintain an optimal transmit power operating point of the PGA using self-configuration without any need to receive permission from an exterior control entity such as the cable head-end. Thus, the invention bypasses the prior art requirement of waiting for a global reconfiguration time from the CMTS (i.e. when the specification assures that there is sufficient time to change the PGA gain). There is a high confidence that this can be achieved if there is sufficient quiet time to perform the self-configuration of the PGA within a specific period of time. It has been determined that such a configuration time statistically should be available with very high probability based on: (1) for each upstream channel, the busy period is far less then the maximum channel period; and (2) the time between two ranging events is relatively long.

Optionally, the upstream power control mechanism can be (1) active full time; (2) turned off, or (3) placed in an 'auto' mode whereby an intelligent entity (e.g., power control manager) determines when to activate the self-configuration mechanism based on cable modem traffic capacity and period-ranging cycle.

The upstream power control mechanism is presented with application to any suitable communications system such as those with two-level amplification as described supra. In addition, the upstream power control mechanism is presented as applied to a DOCSIS enabled communications system.

The upstream power control mechanism of the present invention has several advantages, including (1) optimal gain of the amplifier in the cable modem can be achieved much more quickly; (2) the amplifier gain can be self-configured independently of the CMTS re-configuration time events as mandated by the DOCSIS specification; (3) the mechanism enables significantly improved transmit channel configuration with less noise at the same power resulting in higher transmit rates and/or longer transmit range between the cable modems and the CMTS (e.g., a 3 dB improvement doubles the possible range); (4) the mechanism enables a lower cost DOCSIS 3.0 implementation providing competitive performance.

Note that many aspects of the invention described herein may be constructed as software objects that are executed in embedded devices as firmware, software objects that are executed as part of a software application on either an embedded or non-embedded computer system running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is thus provided in accordance with the invention, a method of upstream power control for use in a cable modem in communication with a head-end and having multiple transmit channels coupled to a single amplifier, the method comprising the steps of receiving a request to change the transmit power levels for one or more individual transmit channels and in response to the request, self-configuring the gain of the amplifier to optimize transmit output power.

There is also provided in accordance with the invention, a method of upstream power control for use in a cable modem in communication with a head-end and having multiple transmit channels coupled to a single amplifier, the method comprising the steps of receiving a request to change the transmit power levels for one or more individual transmit channels, calculating a confidence level for performing a self-configuration of the amplifier within a particular time period and self-configuring the gain of the amplifier to optimize transmit output power of the channels if the confidence level exceeds a threshold.

There is further provided in accordance with the invention, an apparatus for upstream power control for use in a cable modem comprising a plurality of upstream transmit channels coupled to a single amplifier, a power control module operative to receive a request to change the transmit power levels for one or more individual transmit channels, determine a confidence level for performing a self-configuration of the amplifier within a particular time period and configure the gain of the amplifier to optimize transmit output power without the need to first receive permission from a corresponding cable head-end if the calculated confidence level exceeds a threshold.

There is also provided in accordance with the invention, computer program product for configuring the gain of an amplifier coupled to a plurality of upstream transmit channels in a cable modem, the computer program product comprising a computer usable medium having computer usable code embodied therewith, the computer program product comprising computer usable code configured for receiving a request to change the transmit power levels for one or more individual transmit channels, computer usable code configured for calculating a confidence level for performing a self-configuration of the amplifier within a particular time period and computer usable code configured for self-configuring the gain of the amplifier to optimize transmit output power without the need to first receive permission from a corresponding cable head-end if the confidence level exceeds a threshold.

There is further provided in accordance with the invention, cable modem comprising one or more interface ports, a downstream system connected to a CATV radio frequency (RF) signal input and operative to output a plurality of channel data therefrom, an upstream system connected to the CATV radio frequency (RF) signal input, a processor coupled to the one or more interface ports, the downstream system and the upstream system, the processor operative to implement a media access control (MAC) layer operative to generate a plurality of output channels, receive a request to change the transmit power levels for one or more individual transmit channels, calculate a confidence level for performing a self-configuration of the amplifier within a particular time period and self-configure the gain of the amplifier to optimize transmit output power without the need to first receive permission from a corresponding cable head-end if the confidence level exceeds a threshold.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
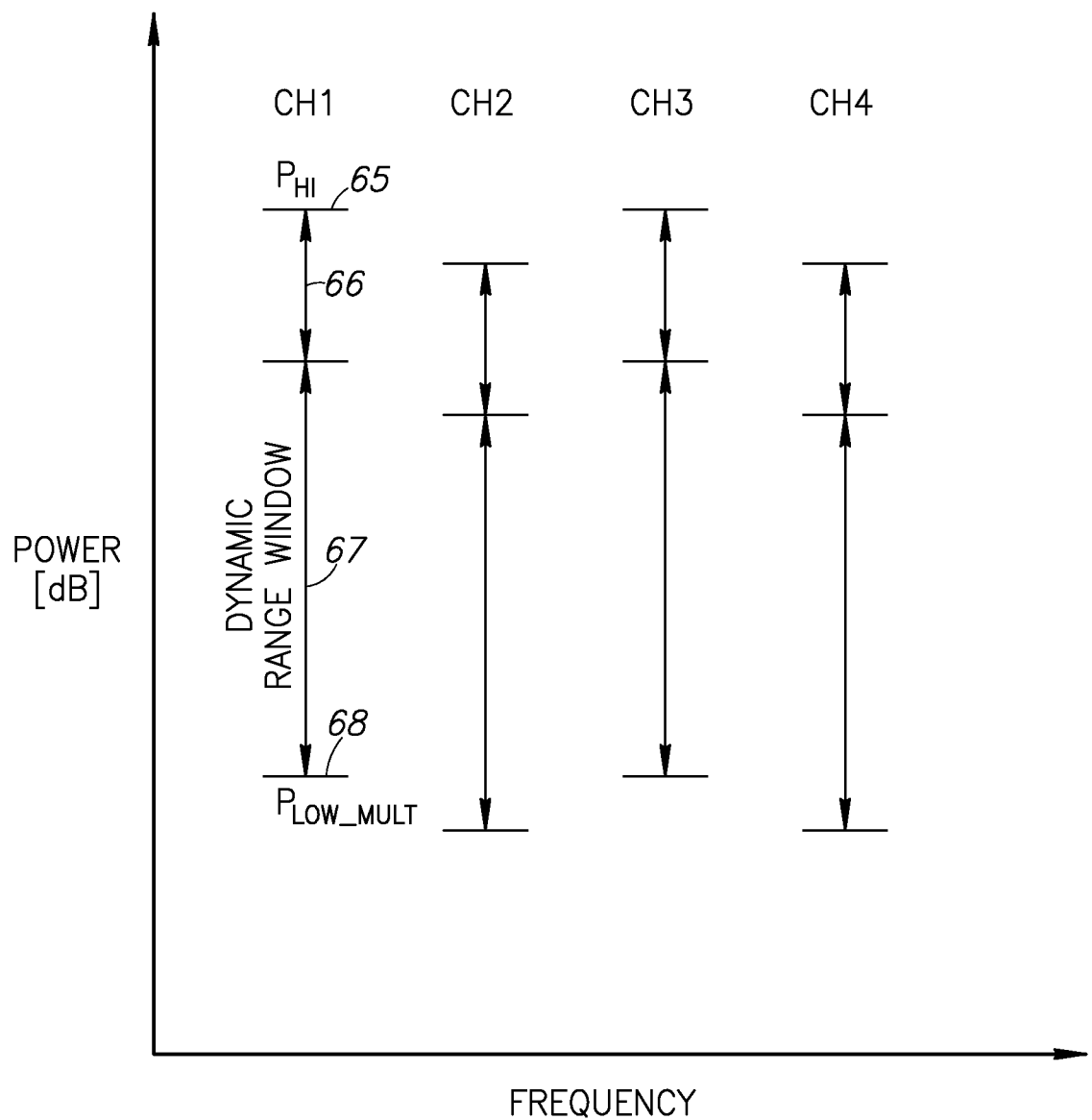
FIG. 1 is a diagram illustrating the dynamic range window for each upstream transmit channel in DOCSIS 3.0 system.

The following notation is used throughout this document.

| Term | Definition |
|------|------------|
| AC | Alternating Current |
| ADC | Analog to Digital Converter |
| ASIC | Application Specific Integrated Circuit |
| ATM | Asynchronous Transfer Mode |
| AVI | Audio Video Interface |
| BMP | Windows Bitmap |
| BWA | Broadband Wireless Access |
| CATV | Community Antenna Television or Cable TV |
| CBW | Capture Bandwidth |
| CM | Cable Modem |
| CMTS | Cable Modem Termination System |
| CO | Central Office |
| CPU | Central Processing Unit |
| CRC | Cyclic Redundancy Code |
| DAC | Digital to Analog Converter |
| DC | Direct Current |
| DECT | Digital Enhanced Cordless Telecommunications |
| DHCP | Dynamic Host Control Protocol |

-continued

| Term | Definition |
| --- | --- |
| DOCSIS | Data Over Cable Service Interface Specification |
| DS | Downstream |
| DSL | Digital Subscriber Line |
| DSP | Digital Signal Processor |
| DVR | Digital Video Recorder |
| ECM | Embedded Cable Modem |
| EDGE | Enhanced Data rates for GSM Evolution |
| EEPROM | Electrically Erasable Programmable Read Only Memory |
| EEROM | Electrically Erasable Read Only Memory |
| EMTA | Embedded Multimedia Terminal Adapter |
| EPROM | Erasable Programmable Read Only Memory |
| EVDO | Evolution-Data Optimized |
| FPGA | Field Programmable Gate Array |
| GPIO | General Purpose I/O |
| GSM | Global System for Mobile Communication |
| HDL | Hardware Description Language |
| HFC | Hybrid Fiber Coaxial |
| I/F | Interface |
| I/O | Input/Output |
| IC | Integrated Circuit |
| IP | Internet Protocol |
| JPG | Joint Photographic Experts Group |
| LAN | Local Area Network |
| LED | Light Emitting Diode |
| LTE | Long Term Evolution |
| MAC | Media Access Control |
| MP3 | MPEG-1 Audio Layer 3 |
| MPEG | Moving Picture Experts Group |
| MPG | Moving Picture Experts Group |
| MSO | Multiple System Cable Operator |
| PC | Personal Computer |
| PDA | Personal Digital Assistant |
| PGA | Programmable Gain Amplifier |
| POTS | Plain Old Telephone Service |
| PSTN | Public Switched Telephone Network |
| QAM | Quadrature Amplitude Modulation |
| QoS | Quality of Service |
| RAM | Random Access Memory |
| RAT | Radio Access Technology |
| RF | Radio Frequency |
| ROM | Read Only Memory |
| SLIC | Subscriber Line Interface Card |
| SNMP | Simple Network Management Protocol |
| SONET | Synchronous Optical Network |
| TB | Tuning Band |
| UMB | Ultra Mobile Broadband |
| UMTS | Universal Mobile Telecommunications System |
| US | Upstream |
| USB | Universal Serial Bus |
| VoIP | Voice over IP |
| WAN | Wide Area Network |
| WCDMA | Wideband Code Division Multiple Access |
| WiFi | Wireless Fidelity |
| WiMAX | Worldwide Interoperability for Microwave Access |
| WLAN | Wireless Local Area Network |
| WMA | Windows Media Audio |
| WMV | Windows Media Video |

DETAILED DESCRIPTION OF THE INVENTION

The present invention is a novel apparatus for and method of upstream power control for multiple transmit channels. The invention is particularly useful in environments that include two level amplification, wherein the first level corresponds to each channel separately and the second level corresponds to the joint sum of all the channels. When working with two-level amplification, changing the joint sum amplification is permitted during specific time periods known as "CMTS re-configuration time" in the DOCSIS specification.

The invention functions to maintain an optimal transmit power operating point of the PGA using self-configuration without any need to receive permission from an exterior control entity such as the cable head-end. Thus, the invention bypasses the prior art requirement of waiting for a global reconfiguration time from the CMTS (i.e. when the specification assures that there is sufficient time to change the PGA gain). There is a high confidence that this can be achieved if there is sufficient quiet time to perform the self-configuration of the PGA within a specific period of time. It has been determined that such a configuration time statistically should be available with very high probability based on: (1) for each upstream channel, the busy period is far less then the maximum channel period; and (2) the time between two ranging events is relatively long.

To aid in understanding the principles of the present invention, the description is provided in the context of a Data-Over-Cable Service Interface Specification (DOCSIS) enabled communications system, in particular DOCSIS 3.0 systems which support data transmission on a minimum of four logical channels over one RF connection, wherein at any given time, any number of channels up to the capability of the modem can be transmitting. It is appreciated, however, that the invention is not limited to use with any particular communication standard and may be used in cable, optical, wired, wireless or other applications. Further, the invention is not limited to use with a specific modulation scheme but is applicable to any modulation scheme including both digital and analog modulation. The invention is applicable to any system in which it is desirable to transfer a data stream in parallel in an optimized manner over a plurality of physical channels wherein the nature of and the capacities of each channel may vary and where the fields of the data units may not be modified or added to in order to reproduce at the receiver the original data stream.

Note that throughout this document, the term communications transceiver, communications device or network device is defined as any apparatus or mechanism adapted to transmit, receive or transmit and receive information through a medium. The communications device, communications transceiver or network device may be adapted to communicate over any suitable medium, including wireless or wired media. Examples of wireless media include RF, infrared, coaxial, optical, microwave, UWB, Bluetooth, WiMAX, GSM, EDGE, UMTS, WCDMA, 3GPP-LTE, CDMA-2000, EVDO, EVDV, UMB, WiFi, or any other broadband medium, radio access technology (RAT), etc. Examples of wired media include twisted pair, coaxial, optical fiber, any wired interface (e.g., USB, Firewire, Ethernet, etc.). The terms communications channel, link and cable are used interchangeably. The terms communications device, communications transceiver or network device are also intended to denote other devices including, but not limited to, a set top box, cable modem, EMTA, residential gateway cable device, embedded cable modem, a multimedia player, mobile communication device, cellular phone, node in a broadband wireless access (BWA) network, smartphone, PDA, wireless LAN (WLAN) and Bluetooth device.

The term cable modem is defined as a modem that provides access to a data signal sent over the cable television infrastructure. The term voice cable modem is defined as a cable modem that incorporates VoIP capabilities to provide telephone services to subscribers. The term 'essential code' is defined as code required to enable the communication device to boot and repeatedly attempt to download and install the full-functionality software upgrade until it is successfully installed. The term 'non-essential' code refers to all other code including not only operating system software, but other code for proper operation of the cable modem, such as in a DOCSIS compliant manner.

The word 'exemplary' is used herein to mean 'serving as an example, instance, or illustration.' Any embodiment described herein as 'exemplary' is not necessarily to be construed as preferred or advantageous over other embodiments.

The term multimedia player or device is defined as any apparatus having a display screen and user input means that is capable of playing audio (e.g., MP3, WMA, etc.), video (AVI, MPG, WMV, etc.) and/or pictures (JPG, BMP, etc.) and/or other content widely identified as multimedia. The user input means is typically formed of one or more manually operated switches, buttons, wheels or other user input means. Examples of multimedia devices include pocket sized personal digital assistants (PDAs), personal media player/recorders, cellular telephones, handheld devices, and the like.

Some portions of the detailed descriptions which follow are presented in terms of procedures, logic blocks, processing, steps, and other symbolic representations of operations on data bits within a computer memory. These descriptions and representations are the means used by those skilled in the data processing arts to most effectively convey the substance of their work to others skilled in the art. A procedure, logic block, process, etc., is generally conceived to be a self-consistent sequence of steps or instructions leading to a desired result. The steps require physical manipulations of physical quantities. Usually, though not necessarily, these quantities take the form of electrical or magnetic signals capable of being stored, transferred, combined, compared and otherwise manipulated in a computer system. It has proven convenient at times, principally for reasons of common usage, to refer to these signals as bits, bytes, words, values, elements, symbols, characters, terms, numbers, or the like.

It should be born in mind that all of the above and similar terms are to be associated with the appropriate physical quantities they represent and are merely convenient labels applied to these quantities. Unless specifically stated otherwise as apparent from the following discussions, it is appreciated that throughout the present invention, discussions utilizing terms such as 'processing,' 'computing,' 'calculating,' 'determining,' 'displaying' or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention can take the form of an entirely hardware embodiment, an entirely software embodiment or an embodiment containing a combination of hardware and software elements. In one embodiment, a portion of the mechanism of the invention is implemented in software, which includes but is not limited to firmware, resident software, object code, assembly code, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium is any apparatus that can contain, store, communicate, propagate, or transport the program for use by or in connection with the instruction execution system, apparatus, or device, e.g., floppy disks, removable hard drives, computer files comprising source code or object code, flash semiconductor memory (USB flash drives, etc.), ROM, EPROM, or other semiconductor memory devices.

Figure 2:
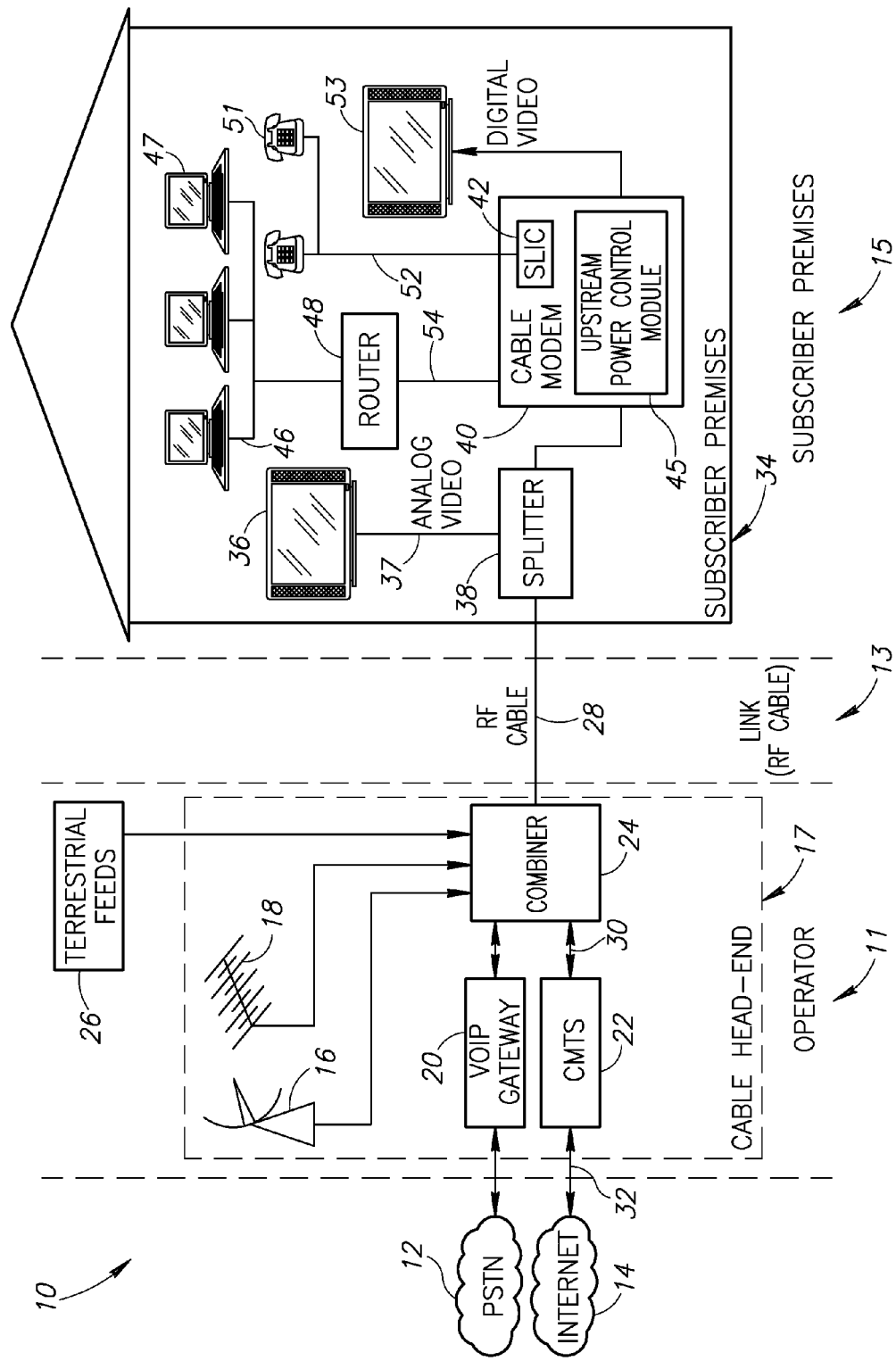
FIG. 2 is a block diagram illustrating an example cable modem system incorporating the upstream power control mechanism of the present invention.

Cable System Incorporating the Upstream Power Control Mechanism A block diagram illustrating an example cable modem system incorporating the upstream power control mechanism of the present invention is shown in FIG. 2. The system, generally referenced 10, comprises an operator portion 11 connected to the public switched telephone network (PSTN) 12 and the Internet 14 or other wide area network (WAN), a link portion 13 comprising the RF cable 28 and a subscriber portion 15 comprising the subscriber premises 34.

The operator portion 11 comprises the cable head-end 17 which is adapted to receive a number of content feeds such as satellite 16, local antenna 18 and terrestrial feeds 26, all of which are input to the combiner 24. The cable head-end also comprises the voice over IP (VoIP) gateway 20 and Cable Modem Termination System (CMTS) 22. The combiner merges the TV programming feeds with the RF data from the CMTS.

The Cable Modem Termination System (CMTS) is a computerized device that enables cable modems to send and receive packets over the Internet. The IP packets are typically sent over Layer 2 and may comprise, for example, Ethernet or SONET frames or ATM cell. It inserts IP packets from the Internet into MPEG frames and transmits them to the cable modems in subscriber premises via an RF signal. It does the reverse process coming from the cable modems. A DOCSIS-compliant CMTS enables customer PCs to dynamically obtain IP addresses by acting as a proxy and forwarding DHCP requests to DHCP servers. A CMTS may provide filtering to protect against theft of service and denial of service attacks or against hackers trying to break into the cable operator's system. It may also provide traffic shaping to guarantee a specified quality of service (QoS) to selected customers. A CMTS may also provide bridging or routing capabilities.

In accordance with one embodiment of the invention, the CMTS comprises an optimized data stream transmit/receive block 44 which functions to optimally transmit and/or receive data units over a plurality of physical channels to subscriber premises using the transmission optimization mechanism of the present invention, described in more detail infra.

The subscriber premises 34 comprises a splitter 38, cable appliances 36 such as televisions, DVRs, etc., cable modem 40, router 48, PCs or other networked computing devices 47 and telephone devices 51. Cable service is provided by the local cable provider wherein the cable signal originates at the cable head end facility 17 and is transmitted over RF cable 28 to the subscriber premises 34 where it enters splitter 38. One output of the splitter goes to the televisions, set top boxes, and other cable appliances via internal cable wiring 37.

The other output of the splitter comprises the data portion of the signal which is input to the cable modem 40. The cable modem is adapted to provide both Ethernet and USB ports. Typically, a router 48 is connected to the Ethernet port via Ethernet cable 54. One or more network capable computing devices 47, e.g., laptops, PDAs, desktops, etc. are connected to the router 48 via internal Ethernet network wiring 46. In addition, the router may comprise or be connected to a wireless access point that provides a wireless network (e.g., 802.11b/g/a) throughout the subscriber premises.

The cable modem also comprises a subscriber line interface card (SLIC) 42 which provides the call signaling and functions of a conventional local loop to the plurality of installed telephone devices 51 via internal 2-wire telephone wiring 52. In particular, it generates call progress tones including dial tone, ring tone, busy signals, etc. that are normally provided by the local loop from the CO. Since the telephone deices 51 are not connected to the CO, the SLIC in the cable modem must provide these signals in order that the telephone devices operate correctly.

In accordance with another embodiment of the invention, the cable modem comprises an upstream power control block 45 which functions to perform self-configuration of the PGA in accordance with the present invention, described in more detail infra.

A digital video output signal generated by the cable modem is displayed to the user (i.e. cable subscribers) via television set 53 (i.e. video display device or other cable appliance). Tuner circuits in the cable modem enable the reception of multiple video channels simultaneously.

Cable Modem Incorporating the Upstream Power Control Mechanism

Figure 3:
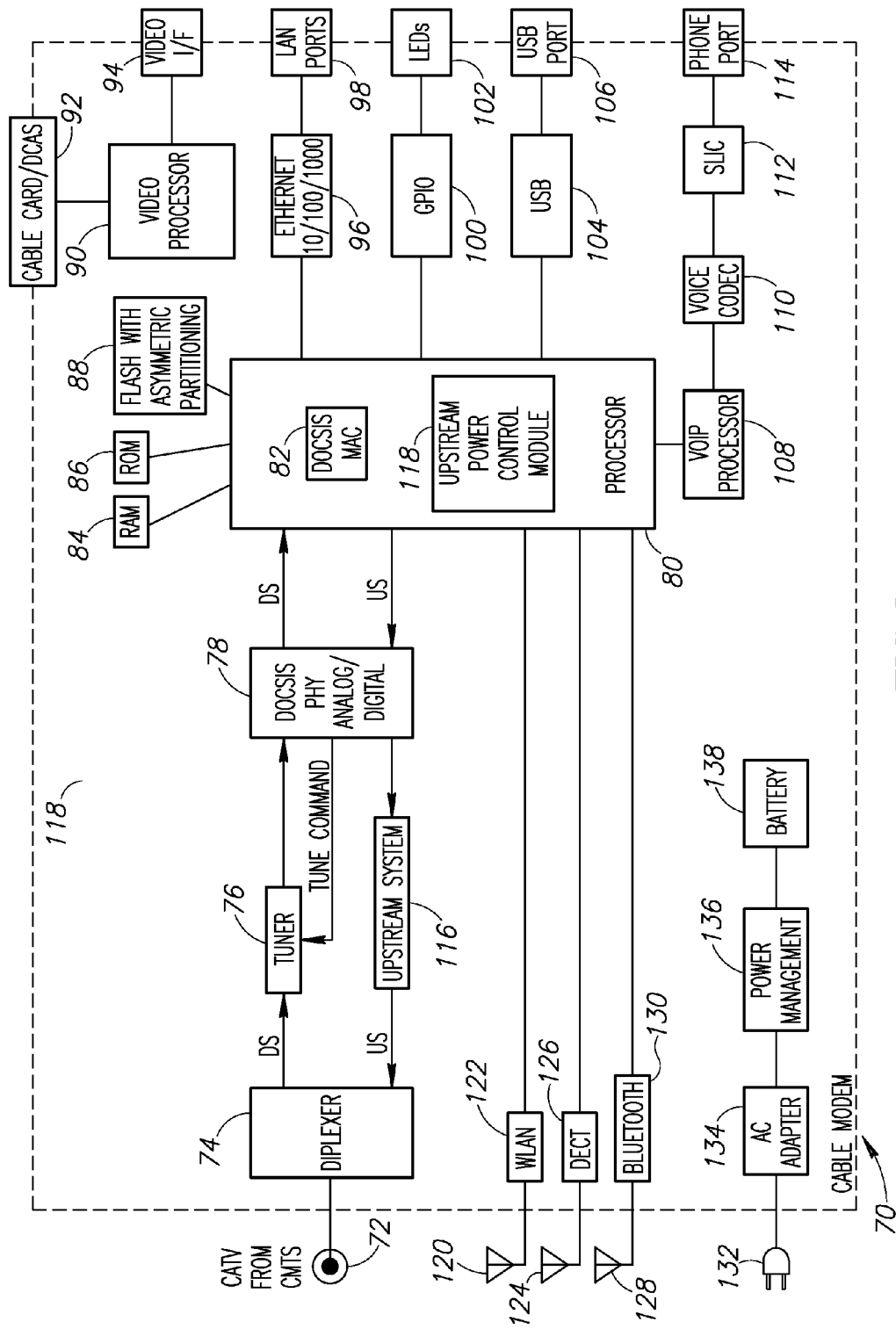
FIG. 3 is a block diagram illustrating an example cable modem incorporating the upstream power control mechanism of the present invention.

A block diagram illustrating an example cable modem incorporating the upstream power control mechanism of the present invention is shown in FIG. 3. The cable modem, generally referenced 70, comprises an upstream system and a downstream system. The downstream system comprises a duplexer 74, tuner 76 and DOCSIS PHY circuit 78. The upstream system comprises the DOCSIS PHY circuit 78, upstream system circuit 116 and diplexer 74.

The cable modem also comprises DOCSIS compatible processor 80, DOCSIS MAC 82, VoIP processor 108, voice codec 110, subscriber line interface card (SLIC) 112, phone port 114, wireless local area network (WLAN) 122 and associated antenna 120, DECT 126 and associated antenna 124, Bluetooth 130 and associated antenna 128, Ethernet interface 96, Ethernet LAN port 98, general purpose input/output (I/O) (GPIO) interface 100, LEDs 102, universal serial bus (USB) interface 104, USB port 106, cable card/Downloadable Conditional Access Systems (DCAS) 92, video interface (I/F) 94, video processor 90, AC adapter 134 coupled to mains utility power via plug 132, power management circuit 136, battery 138, RAM, 84, ROM 86 and flash memory 88.

Note that in the example embodiment presented herein, the cable modem and DOCSIS enabled processor are adapted to implement the DOCSIS 3.0 standard which provides for multiple channel video reception. It is appreciated, however, that the invention is not limited to use in a DOCSIS compatible cable modem but is applicable to numerous other differential amplifier circuit applications as well.

In operation, the cable modem processor is the core chip set which in the example presented herein comprises a central single integrated circuit (IC) with peripheral functions added. The voice over IP (VoIP) processor 108 implements a mechanism to provide phone service outside the standard telco channel. Chipset DSPs and codecs 110 add the functionality of POTS service for low rate voice data.

The cable modem also comprises a subscriber line interface card (SLIC) 112 which functions to provide the signals and functions of a conventional local loop to a plurality of telephone devices connected via the phone port 114 using internal 2-wire telephone wiring. In particular, it generates call progress tones including dial tone, ring tone, busy signals, etc. that are normally provided by the local loop from the CO. Since the telephone deices are not connected to the CO, the SLIC in the cable modem must provide these signals in order that the telephone devices operate correctly.

In a traditional analog telephone system, each telephone or other communication device (i.e. subscriber unit) is typically interconnected by a pair of wires (commonly referred to as tip and ring or together as subscriber lines, subscriber loop or phone lines) through equipment to a switch at a local telephone company office (central office or CO). At the CO, the tip and ring lines are interconnected to a SLIC which provides required functionality to the subscriber unit. The switches at the central offices are interconnected to provide a network of switches thereby providing communications between a local subscriber and a remote subscriber.

The SLIC is an essential part of the network interface provided to individual analog subscriber units. The functions provided by the SLIC include providing talk battery (between 5 VDC for on-hook and 48 VDC for off-hook), ring voltage (between 70-90 VAC at a frequency of 17-20 Hz), ring trip, off-hook detection, and call progress signals such as ringback, busy, and dial tone.

A SLIC passes call progress tones such as dial tone, busy tone, and ringback tone to the subscriber unit. For the convenience of the subscriber who is initiating the call, these tones normally provided by the central office give an indication of call status. When the calling subscriber lifts the handset or when the subscriber unit otherwise generates an off hook condition, the central office generates a dial tone and supplies it to the calling subscriber unit to indicate the availability of phone service. After the calling subscriber has dialed a phone number of the remote (i.e. answering) subscriber unit, the SLIC passes a ring back sound directed to the calling subscriber to indicate that the network is taking action to signal the remote subscriber, i.e. that the remote subscriber is being rung. Alternatively, if the network determines that the remote subscriber unit is engaged in another call (or is already off-hook), the network generates a busy tone directed to the calling subscriber unit.

The SLIC also acts to identify the status to, or interpret signals generated by, the analog subscriber unit. For example, the SLIC provides −48 volts on the ring line, and 0 volts on the tip line, to the subscriber unit. The analog subscriber unit provides an open circuit when in the on-hook state. In a loop start circuit, the analog subscriber unit goes off-hook by closing, or looping the tip and ring to form a complete electrical circuit. This off-hook condition is detected by the SLIC (whereupon a dial tone is provided to the subscriber). Most residential circuits are configured as loop start circuits.

Connectivity is provided by a standard 10/100/1000 Mbps Ethernet interface 96 and Ethernet LAN ports 98, USB interface 104 and USB ports 106 or with additional chip sets, such as wireless 802.11a/b/g via WLAN interface 122 coupled to antenna 120. In addition, a GPIO interface 100 provides an interface for LEDs 102, etc. The network connectivity functions may also include a router or Ethernet switch core. Note that the DOCSIS MAC 82 and PHY 78 may be integrated into the cable modem processor 80 (FIG. 5) or may be implemented separately as shown in FIG. 3 wherein the DOCSIS PHY circuit 78 is shown implemented separately from the processor 80. In addition, the processor or other entity comprises an upstream power control module 118 that is operative to implement self-configuration of the PGA in accordance with the invention, as described in more detail infra.

In the example embodiment presented herein, the tuner 76 is coupled to the CATV signal from the CMTS via port 72 and is operative to convert the RF signal received over the RF cable to an IF frequency in accordance with the tune command signal received from the processor.

The cable modem 70 comprises a processor 80 which may comprise a digital signal processor (DSP), central processing unit (CPU), microcontroller, microprocessor, microcomputer, ASIC, FPGA core or any other suitable processing means. The cable modem also comprises static read only memory (ROM) 86, dynamic main memory 84 and flash memory 88 all in communication with the processor via a bus (not shown).

The magnetic or semiconductor based storage device 84 (i.e. RAM) is used for storing application programs and data. The cable modem comprises computer readable storage medium that may include any suitable memory means, including but not limited to, magnetic storage, optical storage, semiconductor volatile or non-volatile memory, biological memory devices, or any other memory storage device.

In one example embodiment, any software required to implement the upstream power control mechanism of the present invention is adapted to reside on a computer readable medium, such as a magnetic disk within a disk drive unit. Alternatively, the computer readable medium may comprise a floppy disk, removable hard disk, flash memory, EEROM based memory, bubble memory storage, ROM storage, distribution media, intermediate storage media, execution memory of a computer, and any other medium or device capable of storing for later reading by a computer a computer program implementing the system and methods of the invention. The software adapted to implement the upstream power control mechanism of the present invention may also reside, in whole or in part, in the static or dynamic main memories or in firmware within the processor of the computer system (i.e. within microcontroller, microprocessor or microcomputer internal memory).

Figure 4:
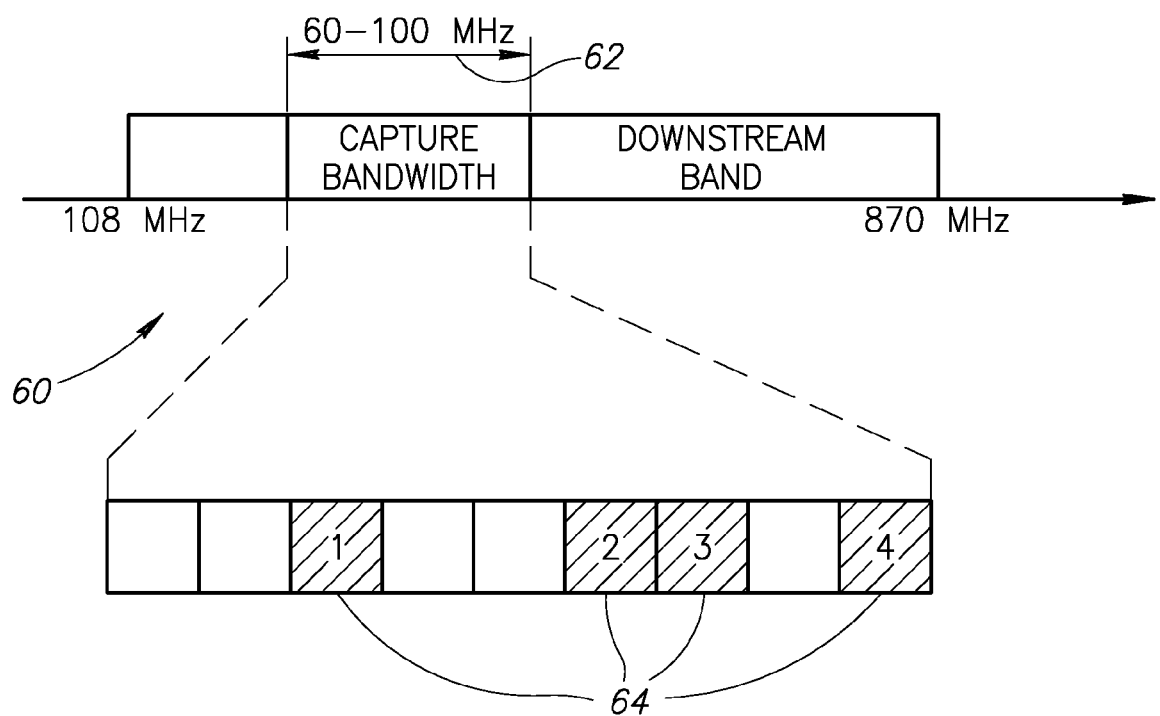
FIG. 4 is a diagram illustrating the capture bandwidth of the downstream band received from the CMTS.

A diagram illustrating the capture bandwidth (CBW) of the downstream band received from the CMTS is shown in FIG. 4. In accordance with the DOCSIS 3.0 specification, used here for illustration purposes only, the downstream (DS) frequency band range, generally referenced 60, extends from 108 MHz to 870 MHz. The capture bandwidth 62 (defined as the sum of the tuning bands in the tuning band (TB) list) is between 60 and 100 MHz in width and may lie anywhere in the DS band. The TB is defines a single continuous frequency interval, in MHz, located anywhere in the downstream band (108 MHz to 870 MHz). The tuning band list (TB List) is defined as a list of one or more Tuning Bands supported by the cable modem that defines the cable modem tuning capabilities.

Within the capture bandwidth, are a plurality (e.g., four) of DS channels 64 that can be located anywhere in the capture bandwidth. An example arrangement of the four DS channels is shown in FIG. 4 where the four DS channels are indicated by the crosshatched channels 64.

Figure 5:
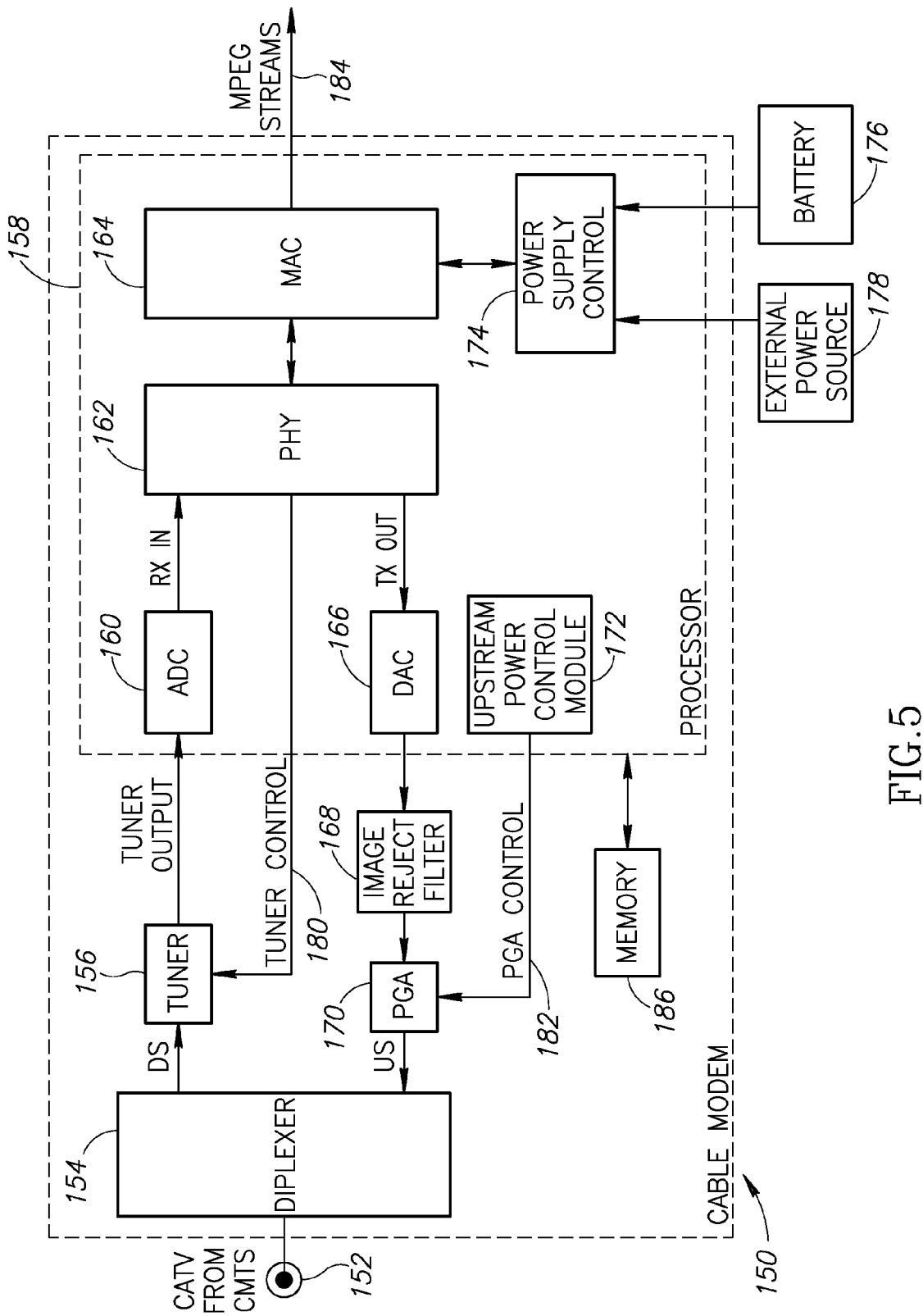
FIG. 5 is a simplified block diagram illustrating the processor of the cable modem of FIG. 3 constructed to implement the upstream power control mechanism in accordance with the present invention.

A simplified block diagram illustrating the processor of the cable modem of FIG. 3 constructed to implement the upstream power control mechanism in accordance with the present invention is shown in FIG. 5. The example cable modem, generally referenced 150, comprises diplexer 154 coupled to a CATV input 152, tuner circuit 156, processor 158, image reject filter 168 and PGA 170. The processor 158 is coupled to memory block 186 and comprises an analog to digital converter (ADC) 160, PHY circuit 162, digital to analog converter (DAC) 166, upstream power control module (i.e. PGA control circuit) 172, power supply control 74 and MAC 164. Power is supplied by an external power source 178, e.g., utility power, etc. or a battery 176.

In operation, in the downstream (i.e. receive) direction, the receive signal from the diplexer is input to the tuner circuit 156. The tuner output signals are input to the one or more ADCs to provide one or more RX I and Q input signals to the PHY circuit. The PHY circuit provides a tuner control signal 180 that controls the tuning of the tuner sub-circuits within the tuner. After MAC processing, one or more MPEG video streams 184 are output of the cable modem.

In the upstream (US) (i.e. transmit) direction, a digital TX output signal provided by the PHY circuit is converted to analog by the DAC. The analog signal is then filtered via the image reject filter before being amplified by the PGA whose gain is controlled by a PGA control signal 182 generated by the upstream power control circuit 172, described in more detail infra.

Upstream Power Control Mechanism

Figure 6:
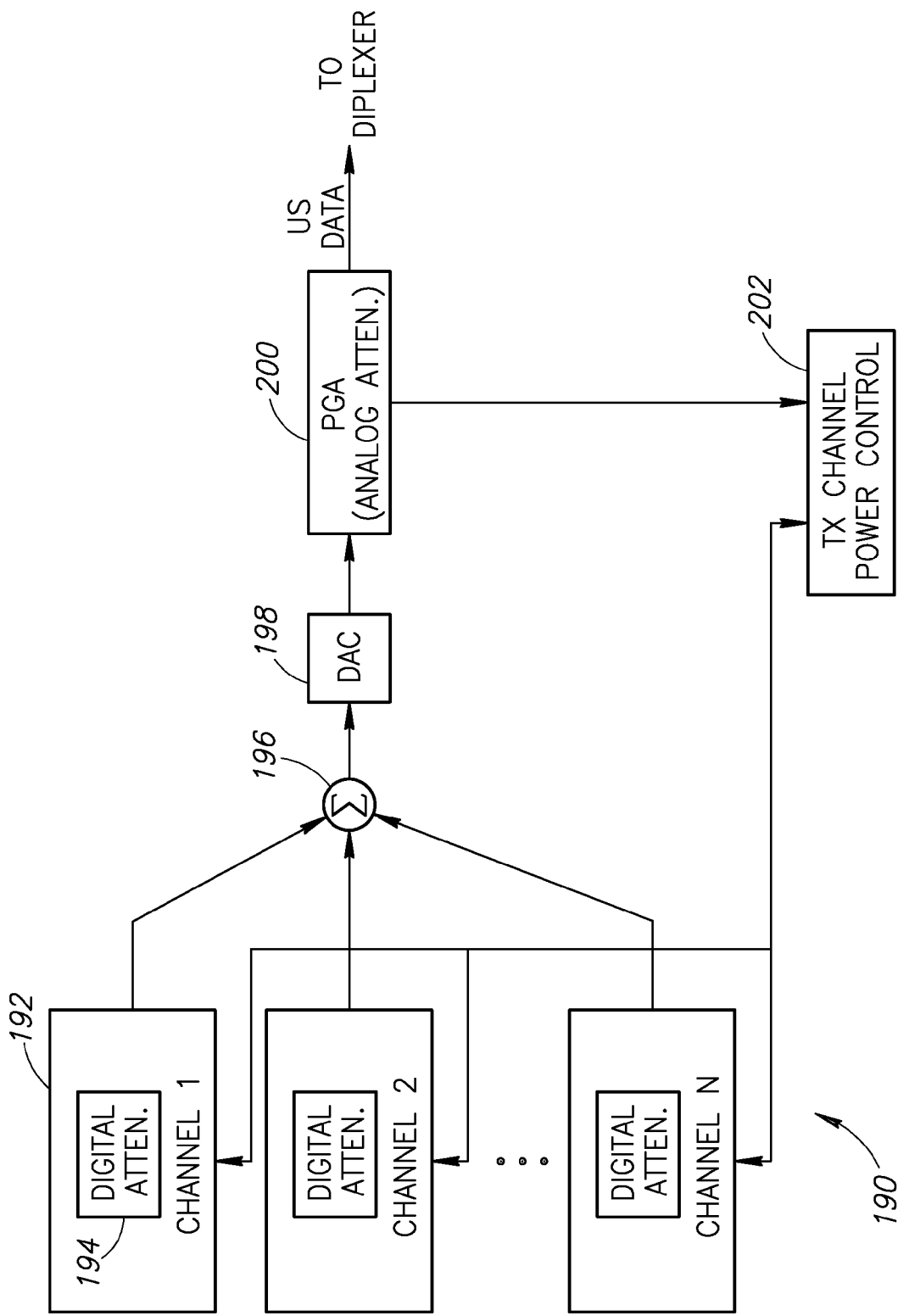
FIG. 6 is a block diagram illustrating multiple upstream transmit channels sharing a single programmable gain amplifier (PGA) in accordance with the present invention.

A block diagram illustrating multiple upstream transmit channels sharing a single programmable gain amplifier (PGA) in accordance with the present invention is shown in FIG. 6. The upstream system, generally referenced 190, comprises a plurality of N physical channels 192, channel #1 to channel #N, each comprising a digital attenuator 194, summer 196, digital to analog converter (DAC) 198, programmable gain amplifier (PGA) 200 and TX channel power control 202.

In operation, the signal generated by each channel is summed after passing through a respective digital attenuator in each of the channels. The output of the summer is converted to analog with is then amplified by the PGA (i.e. analog attenuation) before being fed to the diplexer 74 (FIG. 3). The gain of the PGA is set by the power control module 202. Normally, without the benefit of the invention, the gain of the PGA can only be changed when the CMTS grants a global reconfiguration time (i.e. global quiet is achieved). This requires that each setting of the PGA must be suitable for all possible gain configurations the cable modem would be requested to provide, until the next reconfiguration time. This requires that the digital attenuators in each channel be set with relatively large backoffs before the channel output signals enter the DAC. This affects the bit rate, introduces noise into the system and reduces signal quality. The gain of each channel must be able to be changed in each of the dynamic range windows without changing the PGA gain.

Rather than wait for the CMTS to grant a global reconfiguration time, the present invention is operative to change the PGA gain whenever it is desired to change channel gain, as long as the particular channel is quiet. The gain of the PGA can be changed even when there is a small change in the gain of one of the channels. This allows the upstream system to operate in near optimal transmit power of the PGA by enabling gain changes much more frequently than the $P_{load\_min\_set}$ period. In order to maintain optimal transmit power, the mechanism requires knowledge of the channel capacity and traffic needed to transmit, the time required to switch the PGA gain and the time available to perform the switch. Thus, a confidence level for self-configuration can be calculated and known beforehand. In one embodiment, the PGA gain is only changed if the calculated confidence level exceeds a threshold.

Figure 7:
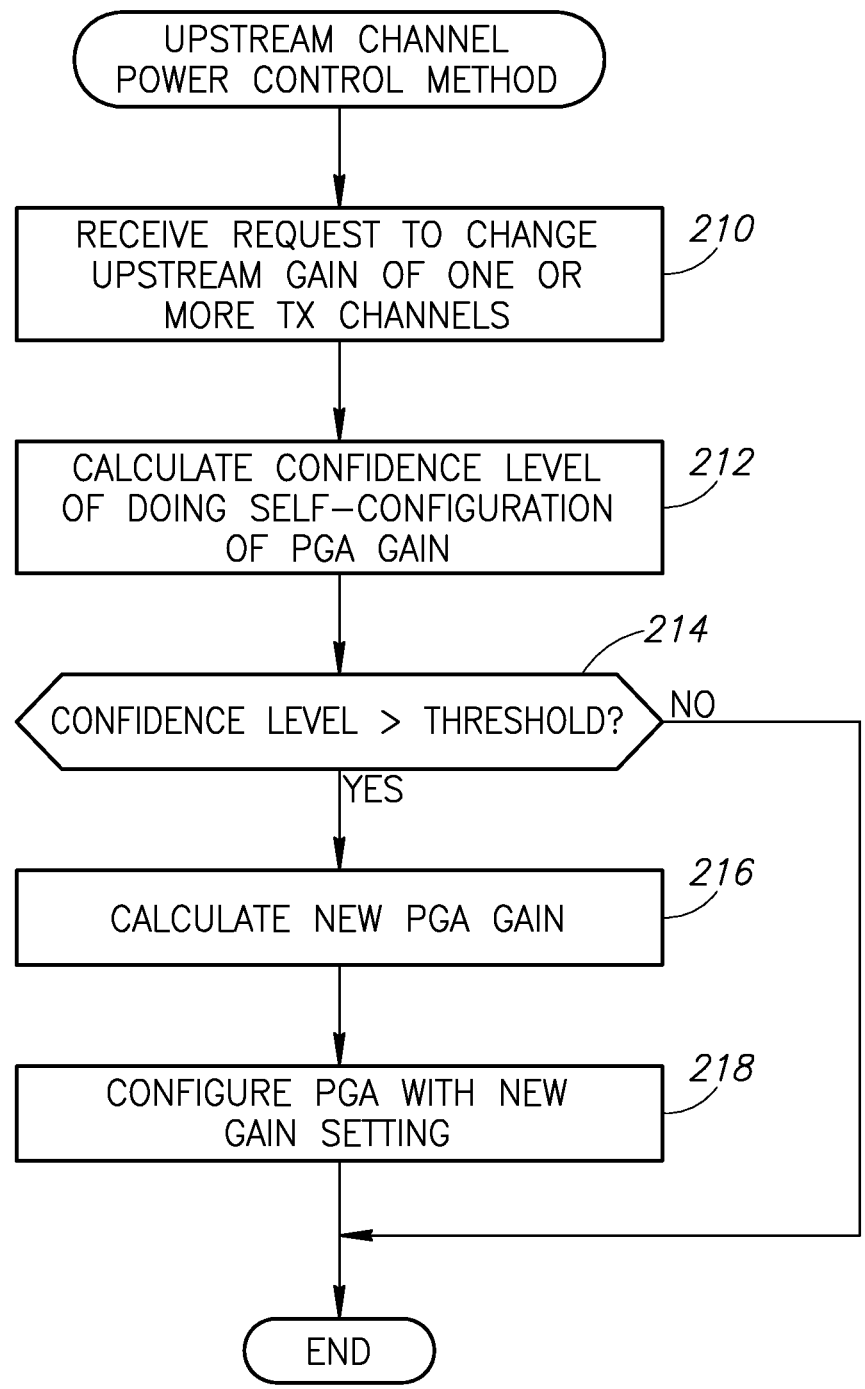
FIG. 7 is a flow diagram illustrating the upstream power control method of the present invention in more detail.

A flow diagram illustrating the upstream power control method of the present invention in more detail is shown in FIG. 7. The method is operative to achieve optimal upstream transmit power without violating the DOCSIS specification. The signals output of the individual channels enter the DAC with the minimum backoff possible in order to reduce spurs which are limited by the DOCSIS specification. Enabling the PGA gain to be changed more frequently permits smaller digital gain changes resulting in improved performance and signal quality.

With reference to FIG. 7, the power control module (or other entity) in the cable modem receives a request to change the upstream gain of one or more transmit channels (step 210). The confidence level of performing the self-configuration of the PGA gain is calculated (step 212). If the confidence level calculated exceeds a threshold (step 214), the new PGA gain is calculated (step 216). The PGA is then configured with the new gain setting (step 218). Note that scheme is also valid for the addition and/or removal of channels.

In typical use cases (99% coverage), it is possible to ensure with very high confidence, whether the time required for self-configuration can be performed within the required bounded time period. The bounded time period is defined as the time between two sequential ranging events. The confidence level is calculated using a mathematical relation between the following:

1. bounded time available for a self-configuration procedure;
2. time required to perform the self-configuration;
3. channel configuration;
4. traffic load;

In general, if $$tx\_1 + \ldots + tx\_N \leq T-t \quad (1)$$

then the confidence level of being able to perform the self-configuration of the PGA gain within the available bounded time period is 100%. Otherwise, the confidence level is given by the following $$P(tx\_silence \geq t) \quad (2)$$

where

T Is the required period within which the PGA gain must be updated. This is normally the time between two ranging periods (could be on the order of seconds or tens of seconds).

tx_i Is the average transmit time of channel i within a period T (i=1 to N). This is effectively the duty cycle of the channel which can be measured or calculated. For example, consider a channel rate limited to 50 Mbps. A transmission rate of 5 Mbps results in a 10% duty cycle.

tx_silence The average time within period T in which all channels are not transmitting. This parameter is typically measured but can be calculated as well. A value of zero indicates there is no silent period and self-configuration cannot be performed. A value of T indicates there are no transmissions.

t Is the time required to reconfigure the new PGA power gain setting. This value should be known from the particular implementation.

Note that the majority of the time, the relation of Equation 1 above holds which is the ideal case. The confidence level when Equation 1 is not true can be calculated or estimated in software as a function of several parameter, including for example, the model assumed in the simulation, uniformity of transmission, size of transmission, etc.

As an example, given a uniform tx_i distribution where all the tx_i values are equal, the following relationship holds and may be close to one:

$$P(tx\_slience \geq t) = \frac{T-t}{(N-1) \cdot tx\_i} \quad (3)$$

Note that the bounded re-configuration time is derived from the period between two sequential ranging events. Currently, the minimum value of this parameter has been found to range from a few seconds up to a few tens of seconds.

Note also that the typical traffic load is bounded by the upstream rate limit of the service provider and is typically much smaller than the maximum rate. For example, although the upstream channel limit in DOCSIS 3.0 is approximately 30-35 Mbps, most service providers limit the upstream rate to a value within the range of 256 kbps to 1 Mbps.

Further, the upstream channel configurations used by most service providers do not employ spread spectrum transmission which is an option in DOCSIS. Use of this option does, however, cause longer transmission periods.

The confidence level of performing self-configuration of the PGA gain within the required time while considering the above mentioned conditions (i.e. long bounded period, low bandwidth usage of the upstream traffic and no use of optional spread spectrum transmission) is asymptotic seeking to 100%.

Optionally, to provide flexibility, the mechanism includes one or more operation modes which controls the self-configuration feature of the invention. In one operation mode, the self-configuration can be turned off (which provides suboptimal performance of the prior art). In a second operation mode, the self-configuration feature is always active. Note that this mode may cause a violation of the DOCSIS specification depending on the implementation. In a third operation mode, the self-configuration feature is automatically turned on and off. An intelligent entity (i.e. power control module) determines whether to activate the self-configuration feature based on an estimate of the confidence level which is derived from the current cable modem configuration and traffic activities.

Figure 8:
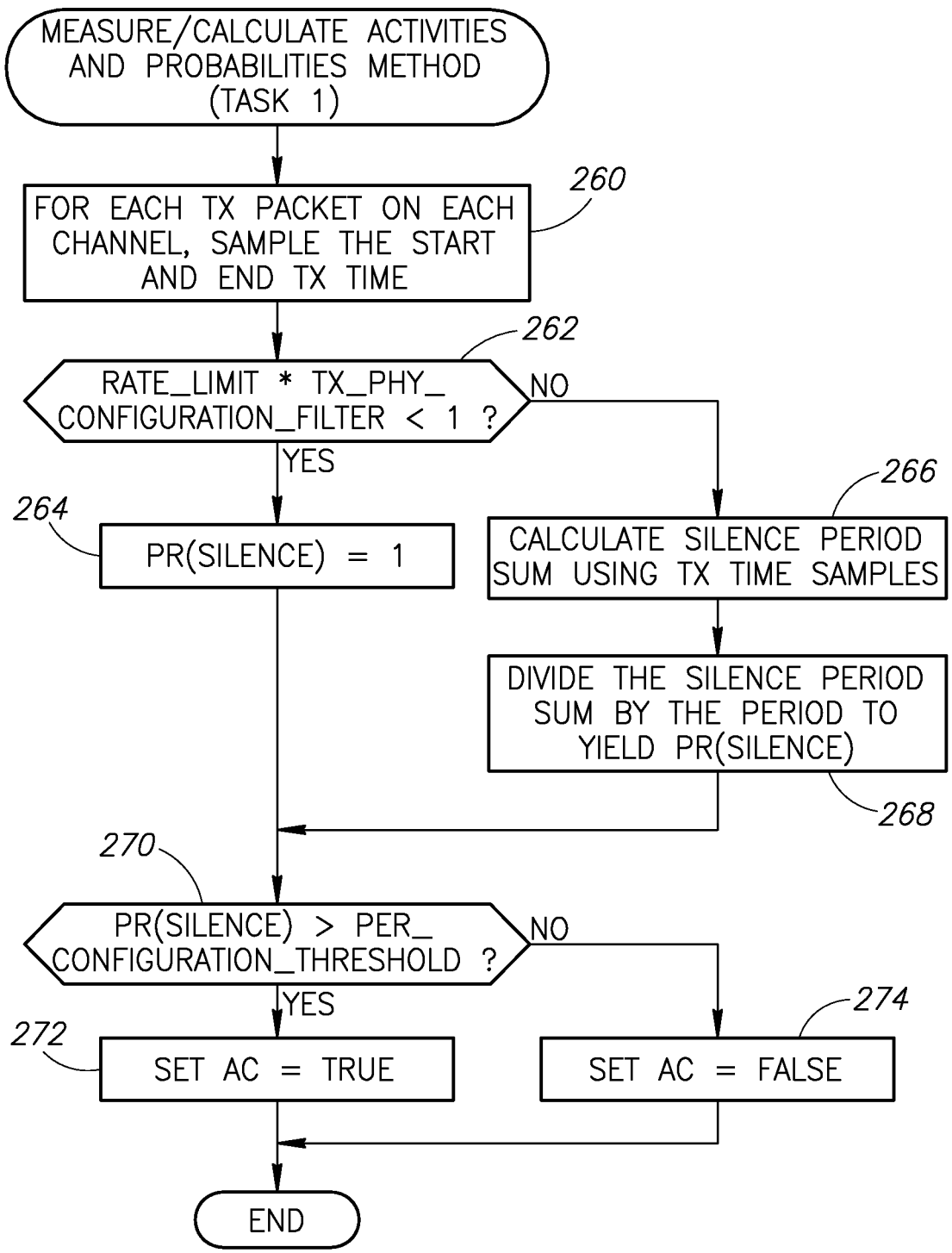
FIGS. 8 and 9 are flow diagrams illustrating the PGA gain configuration method of the present invention in more detail.
Figure 9:
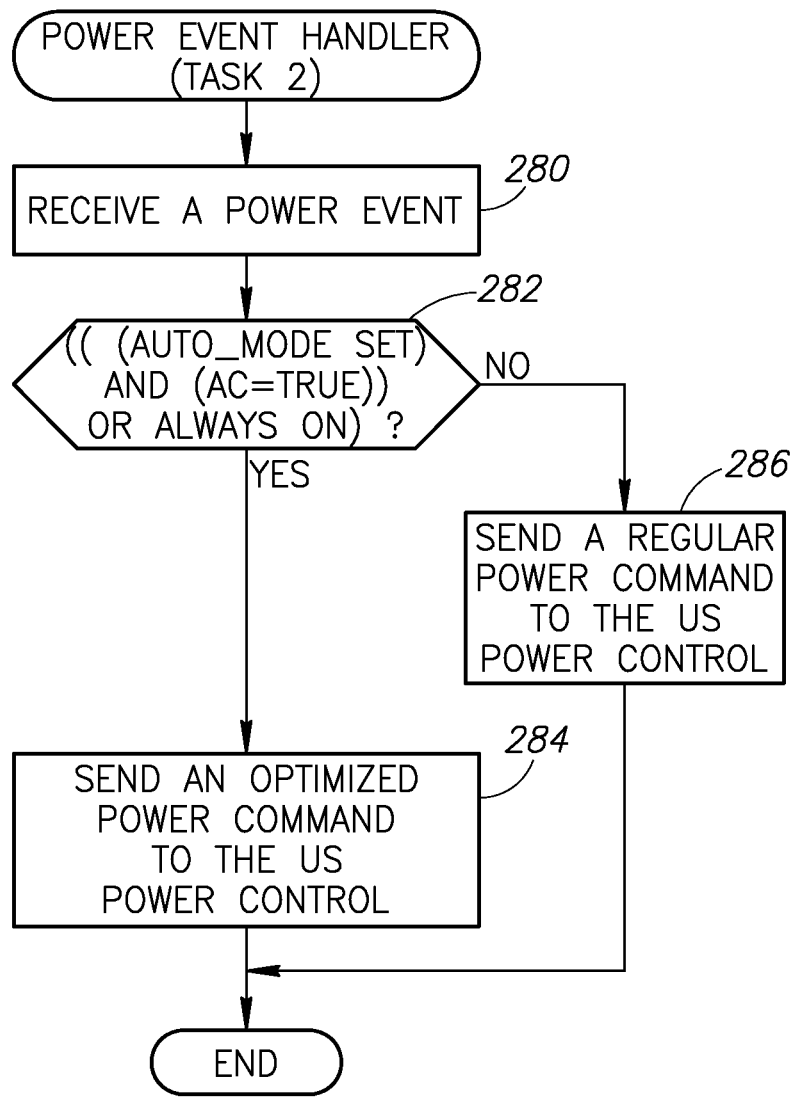

A flow diagram illustrating the PGA gain configuration method of the present invention in more detail is shown in FIGS. 8 and 9. In general, the PGA gain is set in accordance with the new power sum. The final gain, however, depends on the characteristics of the PGA. For example, considering a PGA with a 2 dB step size, the nearest step must be found while any residue compensated for using a digital attenuator.

A flow diagram illustrating the method of measuring/calculating activities and probabilities is shown in FIG. 8. For each TX packet on each channel, the start and end TX times are sampled (step 260). If the rate_limit*TX_phy_configuration_factor is less than one (step 262), then set the probability of silence Pr(silence) equal to one (step 264). Note that rate_limit is a configurable value per application/user and TX_phy_configuration_factor is derived from the DOCSIS PHY specification. Otherwise, calculate a silence period sum using the TX time samples measured in step 260 (step 266). Then, divide the silence period sum by the length of the time period (step 268). The result of the division is the Pr(silence) value.

If the value of the Pr(silence) is greater than the per_configuration_threshold (step 270), then set the Accumulated Capacity (AC) flag equal to TRUE (step 272), otherwise set AC equal to FALSE (step 274). Note that the Accumulated Capacity flag is adapted to hold the state of the channel regarding capacity.

Figure 10:
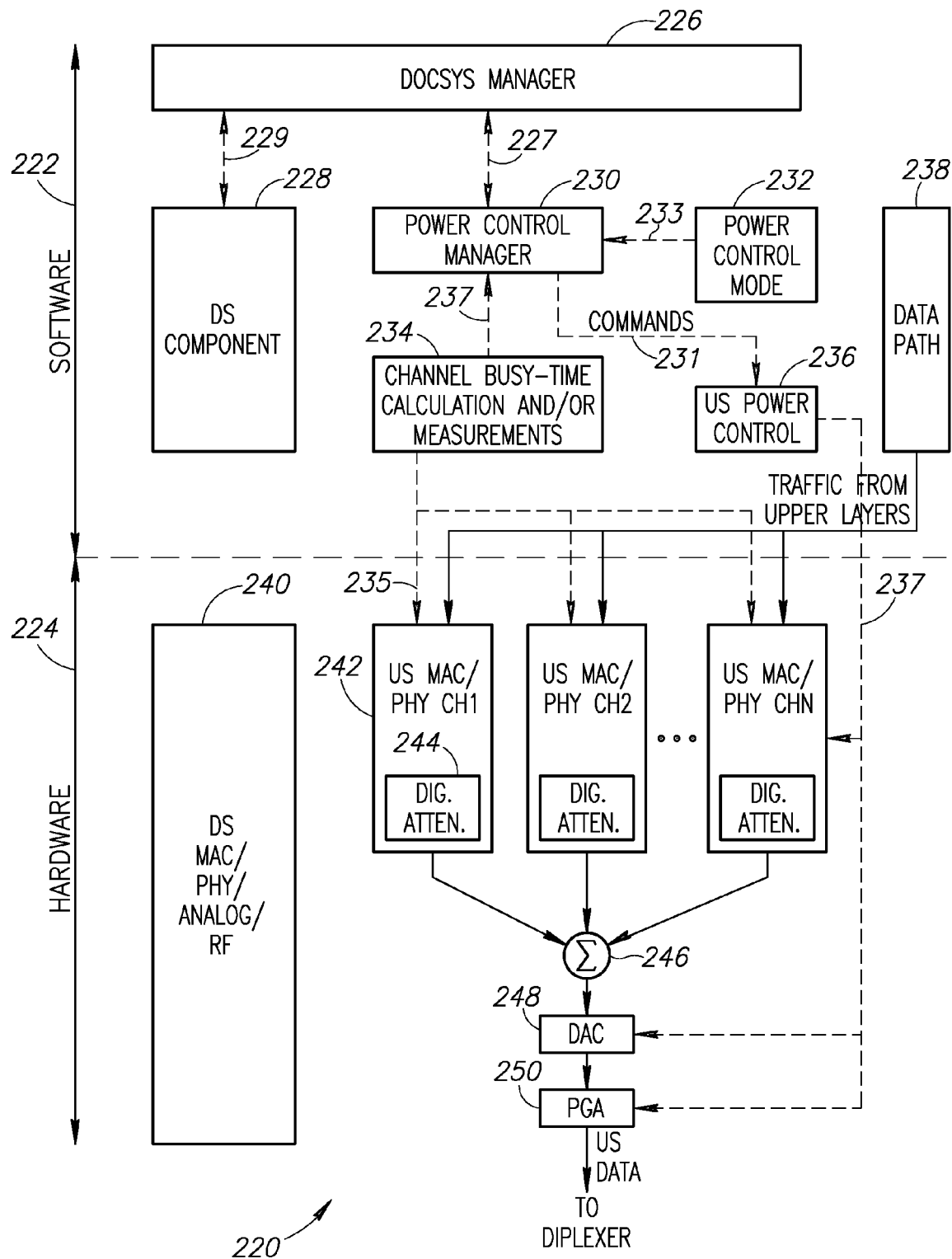
FIG. 10 is a block diagram illustrating an example cable modem hardware/software demarcation and architecture incorporating the upstream power control mechanism of the present invention.

A flow diagram illustrating the power event handler method of the present invention is shown in FIG. 9. First, a power event is received (step 280). A power event refers to a ranging or Upstream Channel Descriptor (UCD) change message received from the CMTS. If (auto$_{13}$ mode is set and AC equals TRUE) or "is always on" (i.e. the self re-configuration time is always on, equivalent to setting per_configuration_threshold to a negative number (step 282), then send an optimized power command to the upstream (US) power control 236 (FIG. 10). This command sets the PGA 250 and digital attenuator 244 in an optimized manner. Otherwise (step 282), send a regular power command to the upstream power control 236 (step 286). Note that this sets the PGA and/or the digital attenuator to conventional functionality.

A block diagram illustrating an example cable modem hardware/software demarcation and architecture incorporating the upstream power control mechanism of the present invention is shown in FIG. 10. The architecture, generally referenced 220, is divided into a hardware portion 224 and a software portion 222. Note that the demarcation between hardware and software shown is one possible example. It is appreciated that architectures with any arbitrary demarcation between hardware and software are possible and are within the scope of the invention. In the example shown, the upstream power control scheme is mainly implemented in software utilizing hardware control mechanisms, including transmit time measurements, PHY, DAC and PGA control circuits.

The hardware portion 224 comprises downstream (DS) MAC/PHY/analog/RF block 240, a plurality of upstream MAC/PHY channels 242 (i.e. channels #1 through #N), summer 246, DAC 248 and PGA 250 which is operative to generate the upstream signal input to the diplexer. Each channel comprises a digital attenuator 244 for setting the backoff to the DAC.

The software portion 222 comprises a DOCSIS manager 22, DS component 228, power control manager 230, power control mode 232, channel busy-time calculation and/or measurement block 234, upstream (US) power control block 236 and data path block 238. Note that dotted lines and arrows in FIG. 10 denote control paths while solid lines and arrows denote data paths.

The DOCSIS manager block 226 is operative to implement DOCSIS stack management and control functions. It receives Upstream Channel Descriptor (UCD) messages from the DS component 228, parses the messages and sends the relevant command requests to the power control manager 230. Note that the DOCSIS manager is the entity receives requests to change the power on one or more upstream channels from the CMTS. New configuration information for one or more channels is passed to the power control module via control path 227 while UCD and other message related information is communicated with the DC component via control path 229.

The DS component 228 functions to receive data and management frames from the DS MAC interface 240 and forwards them to the relevant destination such as the DOCSIS manager 226 via control path 229.

The power control mode block 232 is a configurable component that maintains the power control mode (i.e. on, off and automatic). The mode is communicated to the power control manager 230 via control path 233.

The power control manager component 230 functions to handle commands from the DOCSIS manager (including responding accordingly) via control path 227. It also functions to determine if and when to configure the hardware in accordance with channel capacity and timing parameters, i.e. it determines the gain for each channel (via control path 231). It is the power control module that comprises necessary intelligence and resources to implement the PGA self-configuration mechanism of the present invention.

The upstream power control component 236 functions to configure the hardware in accordance with the commands received from the power control module. It configures each channel 242, the DAC 248 and the PGA 250 via control path 237.

Use of the mechanism of the invention reduces the requirements to adjust the gain using the digital attenuator in each channel which inserts relatively large amounts of noise due to the large back off. Note that the use of the digital attenuator will still be frequent. The US power control component is operative to set the DAC parameters including, for example, bias current, working point, number of bits, etc. The US power also sets the gain of the PGA (i.e. the backoff or analog attenuation). In accordance with the mechanism, the digital backoff is minimized thus improving the noise figure. Once the PGA is placed in the optimal setting, the digital attenuation affects are minimized.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of upstream power control for use in a cable modem in communication with a head-end and having multiple transmit channels coupled to a single amplifier, said method comprising the steps of:

receiving, by a processor, a request to change the transmit power levels for one or more individual transmit channels;

in response to said request, self-configuring, by said processor, the gain of said amplifier to optimize transmit output power; and wherein a confidence level for performing said self-configuration is considered 100% if the sum of the average transmit times of each channel is less than or equal to the required time period in which the amplifier gain must be updated less the time needed for said self-configuration.

2. The method according to claim 1, wherein said amplifier gain is configured when said transmit channels are substantially quiet.

3. The method according to claim 1, wherein said amplifier gain is configured without the need to first receive permission from a corresponding cable head-end.

4. The method according to claim 1, wherein said method is adapted to be implemented in a Data-Over-Cable Service Interface Specification (DOCSIS) enabled communications system.

5. The method according to claim 1, wherein said amplifier is self-configured only if said confidence level for performing said self-configuration within a particular time period exceeds a threshold.

6. The method according to claim 1, wherein said confidence level is the probability that the average time all channels are quiet during the required time period in which the amplifier gain must be updated is greater than or equal to the time required to perform said self-configuration.

7. The method according to claim 1, wherein said confidence level is calculated as a function of the bandwidth usage of upstream channels.

8. The method according to claim 1, wherein said confidence level is calculated as a function of whether spread spectrum transmission is active on said channels.

9. The method according to claim 1, wherein said confidence level is calculated as a function of the duration of the bounded period between two sequential ranging events.

10. The method according to claim 1, further comprising the step of providing the capability of activating and deactivating said self-configuration method.

11. The method according to claim 1, further comprising the step of determining whether to activate said self-configuration based on an estimated confidence level derived from a current cable modem configuration.

12. A method of upstream power control for use in a cable modem in communication with a head-end and having multiple transmit channels coupled to a single amplifier, said method comprising the steps of:

receiving, by a processor, a request to change the transmit power levels for one or more individual transmit channels;

determining, by the processor, a confidence level for performing a self-configuration of said amplifier within a particular time period; and wherein said confidence level for performing said self-configuration is considered 100% if the sum of the average transmit times of each channel is less than or equal to the required time period in which the amplifier gain must be updated less the time needed for said self-configuration; and self-configuring, by the processor, the gain of said amplifier to optimize transmit output power of said channels if said confidence level exceeds a threshold.

13. The method according to claim 12, wherein said amplifier gain is configured when said transmit channels are substantially quiet.

14. The method according to claim 12, wherein said amplifier gain is configured without the need to first receive permission from a corresponding cable head-end.

15. The method according to claim 12, wherein said method is adapted to be implemented in a Data-Over-Cable Service Interface Specification (DOCSIS) enabled communications system.

16. The method according to claim 12, wherein said confidence level is the probability that the average time all channels are quiet during the required time period in which the amplifier gain must be updated is greater than or equal to the time required to perform said self-configuration.

17. The method according to claim 12, wherein said confidence level is calculated as a function of the bandwidth usage of upstream channels.

18. The method according to claim 12, wherein said confidence level is calculated as a function of whether spread spectrum transmission is active on said channels.

19. The method according to claim 12, wherein said confidence level is calculated as a function of the duration of the bounded period between two sequential ranging events.

20. The method according to claim 12, further comprising the step of providing the capability of activating and deactivating said self-configuration method.

21. The method according to claim 12, further comprising the step of determining whether to activate said self-configuration based on an estimated confidence level derived from a current cable modem configuration.

* * * * *